(12) United States Patent
Theriault et al.

(10) Patent No.: US 7,760,449 B2
(45) Date of Patent: Jul. 20, 2010

(54) ADJUSTABLE OPTICAL MOUNTING AND METHOD

(75) Inventors: Philip C. Theriault, Tucson, AZ (US); Anthony O. Lee, Tucson, AZ (US); Christopher A. Roth, Round Rock, TX (US)

(73) Assignee: Raytheon Company, Waltham, MA (US)

( * ) Notice: Subject to any disclaimer, the term of this patent is extended or adjusted under 35 U.S.C. 154(b) by 551 days.

(21) Appl. No.: 11/696,943

(22) Filed: Apr. 5, 2007

(65) Prior Publication Data

US 2007/0195435 A1    Aug. 23, 2007

Related U.S. Application Data

(63) Continuation-in-part of application No. 10/968,609, filed on Oct. 19, 2004.

(60) Provisional application No. 60/793,580, filed on Apr. 19, 2006.

(51) Int. Cl.
*G02B 7/02* (2006.01)

(52) U.S. Cl. .................................. 359/819; 359/811

(58) Field of Classification Search ................ 359/819, 359/811
See application file for complete search history.

(56) References Cited

U.S. PATENT DOCUMENTS

| | | | |
|---|---|---|---|
| 4,655,548 A * | 4/1987 | Jue | 348/373 |
| 4,701,607 A | 10/1987 | El-Hanany et al. | |
| 4,763,991 A | 8/1988 | Klotz, Jr. et al | |
| 5,003,401 A | 3/1991 | Otsuka et al. | |
| 6,478,434 B1 | 11/2002 | Streetman et al. | |
| 7,599,138 B2 | 10/2009 | Theriault et al. | |
| 2003/0193621 A1 | 10/2003 | Duggan et al. | |
| 2004/0008429 A1 | 1/2004 | Watson et al. | |
| 2006/0081745 A1 | 4/2006 | Theriault et al. | |

FOREIGN PATENT DOCUMENTS

| | | |
|---|---|---|
| JP | 07181538 | 7/1995 |
| JP | 08201938 | 8/1996 |
| JP | 2005173249 | 6/2005 |

* cited by examiner

*Primary Examiner*—Jordan M. Schwartz
*Assistant Examiner*—James C Jones
(74) *Attorney, Agent, or Firm*—Renner, Otto, Boisselle & Sklar, LLP

(57) ABSTRACT

A method of adjusting an optical system includes placing the optical system in a controlled environment enclosure, and adjusting an optical mount of the optical system while the optical system is in the controlled environment enclosure.

20 Claims, 15 Drawing Sheets

ADJUSTABLE OPTICAL MOUNTING AND METHOD

This application is a continuation in part of U.S. application Ser. No. 10/968,609, filed Oct. 19, 2004, and claims priority under 35 USC 119 of U.S. Provisional Patent Application No. 60/793,580, filed Apr. 19, 2006. Both of the above applications are hereby incorporated by reference in their entireties.

BACKGROUND OF THE INVENTION

1. Technical Field

The invention relates generally to adjustable systems for mounting devices, such as optical devices, and to methods for adjusting optical systems.

2. Background of the Related Art

Position adjustment of optical imaging detectors in four or more degrees of freedom is currently accomplished by insertion of shims between an optical bench or mount and a detector assembly. For high performance imagers, this process is complex and time consuming. First a nominal shim is installed to position the detector in a nominally correct position. The entire sensor is assembled and extensive sensor characterization is performed. This testing indicates where the detector should be relative to where it was initially located. Then the sensor is completely disassembled and the shims of each detector are changed to a different thickness, as indicated by the prior test results. The sensor is then re-assembled and the cycle of testing is repeated. Multiple cycles are often required to achieve desired sensor position. This is extraordinarily burdensome for systems that operate in cryogenic or vacuum environments, because human assemblers are not able to work in these environments. Cycling the system from the operating environment to nominal ambient for each adjustment is significantly time consuming. The situation is further complicated by the strains induced by such cycling. These strains tend to cause elements to shift or change loads, so that the ideal assembly configuration is even harder to predict under ambient conditions. Thus, the current process may be extensive and time consuming. It will be appreciated from the foregoing that improvements in optical mounting would be desirable.

SUMMARY OF THE INVENTION

According to an aspect of the invention, an adjustable optical mounting is adjustable without need for disassembly.

According to yet another aspect of the invention, an adjustable optical mounting may be adjusted in situ while in a controlled environment enclosure. The optical mounting may be adjustable while in the enclosure by feedthroughs, or by other types of remote control.

According to another aspect of this invention, the non-ambient environment within which the optical system is adjusted may be particularly hostile to human assemblers, such as cryogenic or vacuum conditions, unlike previous mechanisms such as those described in U.S. Pat. No. 4,763, 991.

According to still another aspect of the invention, an optical mounting is adjustable by turning one manipulator at a time, without putting undue stresses on an optical element secured to the mounting.

According to a further aspect of the invention, an adjustable optical mounting is adjustable in at least four degrees of freedom.

According to a still further aspect of this invention, these degrees of freedom are provided in a single direct mechanical path, rather than by nested adjustment stages (such as inner and outer gimbals), thereby maximizing the thermal conductivity and vibrational stiffness of the mounting (critical in high acceleration and cryogenic operating conditions), and minimizing size and weight (critical in space vehicle applications).

According to a further aspect of this invention, an optical mounting adjustment, when set within an environmental enclosure, provides sufficient binding force to hold the elements in place as the environment is returned to conditions more suitable for further assembly, where the adjustments may be finally locked in place through any of various means.

According to a related aspect of this invention, an optical mounting adjusted within an environmental enclosure is self locking through various conventional means.

According to a still further aspect of the invention, a method of adjusting an optical system includes adjusting an optical mounting of the system while the system is operating in a controlled environment enclosure, thus minimizing calibration cycles and delays, and improving calibration quality.

According to another aspect of the invention, a method of adjusting an optical system includes the steps of: placing the optical system in a controlled environment enclosure; producing non-ambient conditions within the enclosure; and adjusting an optical mount of the optical system while the optical system is in the non-ambient conditions within the enclosure. This method minimizes calibration cycles and delays, and improves calibration quality.

According to yet another aspect of the invention, an adjustable optical mounting includes: a base; a support configured to receive at least one optical device; and plural adjusters having respective cams that include eccentric cam surfaces that are mechanically coupled to the support. Rotation of the cams causes translation of the support relative to the base. The optical mounting is adjustable in at least four degrees of freedom. The optical mounting is a single tiered adjustment mounting. The optical mounting is an independent adjustment mounting. The optical mounting may also have threaded fasteners, such as screws, that may be adjusted to effect translation and/or rotation of the support relative to the base.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

In the annexed drawings, which are not necessarily to scale.

DETAILED DESCRIPTION

An adjustable optical mounting includes a mounting support or frame, and multiple adjusters to provide adjustment in at least four degrees of freedom of the support, relative to a base. The adjusters include cams with cam surfaces that bear against and engage slots in the support or frame, to translate the support in directions parallel to the base. In addition, threaded devices and resilient (compliant) devices such as springs are utilized to adjust the height of the support relative to the base, at multiple locations. The cams and the threaded devices of the adjusters may be independently adjusted to translate the support relative to the base, and/or to change the height and/or tilt angle of the support.

The adjustable optical mounting may be part of an optical system that is adjusted while in a controlled environment enclosure. The controlled environment enclosure may have a non-ambient temperature and/or pressure, for example being at a cryogenic temperature and/or at a vacuum. The optical mounting has a shimless adjustment mechanism (a final adjustment mechanism that does not rely on shims) that allows it to be adjusted without disassembly, while within the controlled environment enclosure. Thus the optical system may be adjusted in situ in a non-ambient environment that may simulate conditions under which the optical system will be used. The optical mounting may also have a locking mechanism or sufficient binding force within its mechanism to maintain its adjustment once a desired configuration of the optical system is achieved.

The system and method described herein allow significant savings in adjustment time and effort for optical systems used in non-ambient conditions. Rather than having to remove an optical system from a controlled environment and disassemble it in order to make adjustments, a process that may have to be repeated several times, the optical system can be remotely adjusted while within the controlled environment chamber. It should be noted that cycling of controlled environment systems that involve vacuums and/or cryogenic temperatures may be very time consuming and costly.

Figure 1:
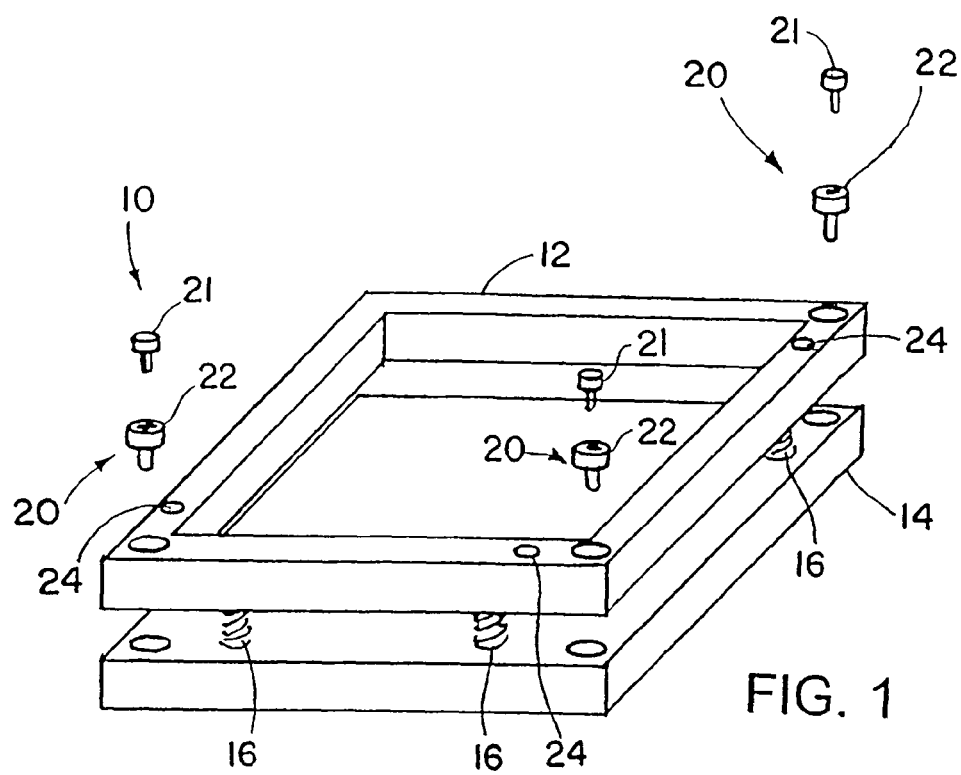
FIG. 1 is a conceptual diagram of an optical mounting in accordance with the present invention.
Figure 2:
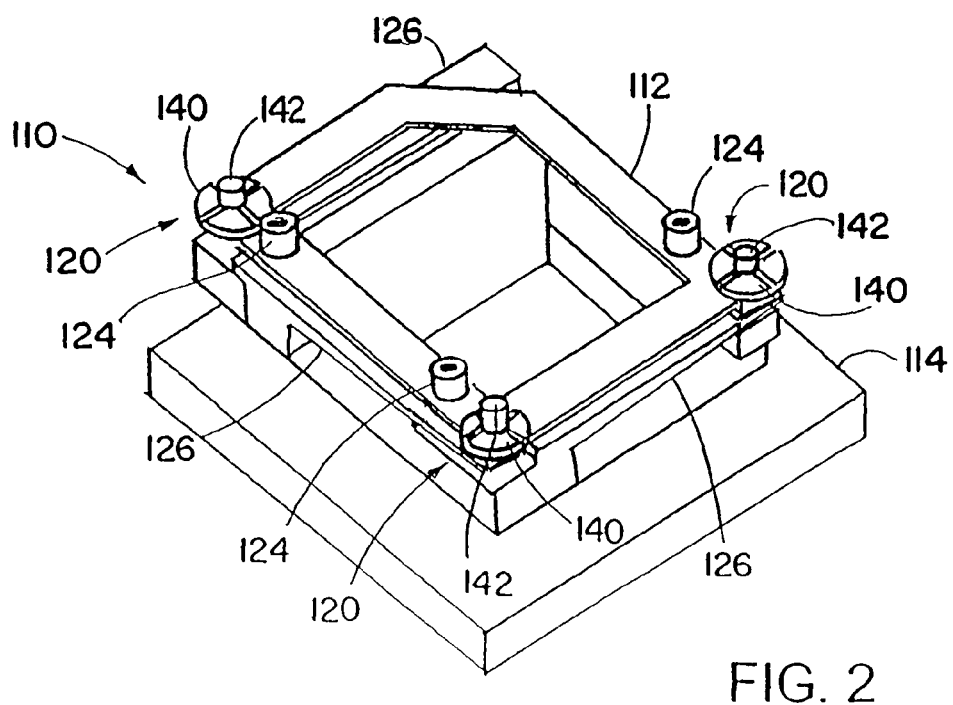
FIG. 2 is an oblique view of one embodiment of an optical mounting in accordance with the present invention.
Figure 3:
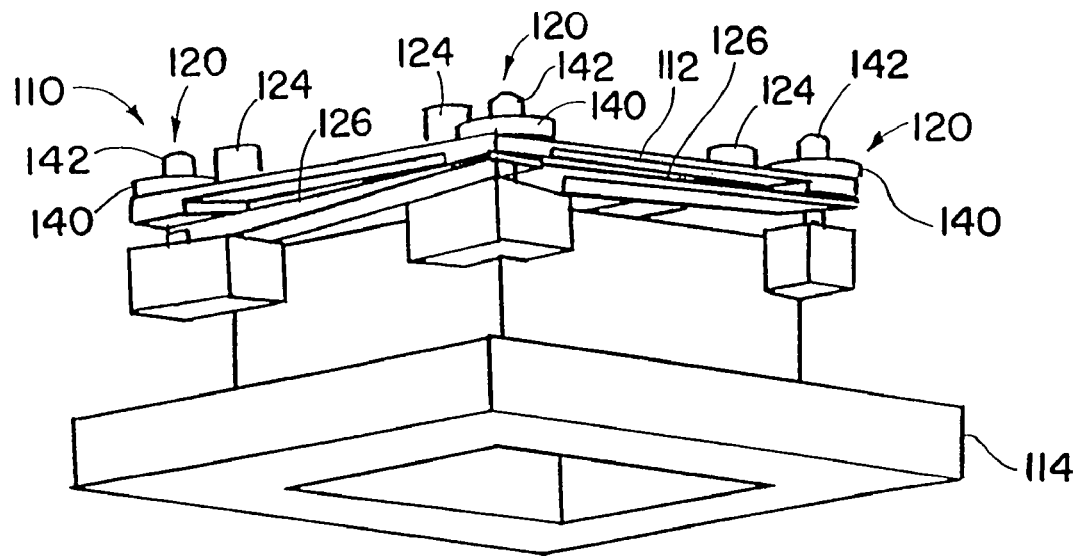
FIG. 3 is another view of the optical mounting of FIG. 2.

Referring initially to FIG. 1, an adjustable optical mounting 10 includes a support or frame 12 to which an optical device may be coupled. The support 12 may be adjustable relative to a base 14 at least four degrees of freedom, such as in four, five, or six degrees of freedom. The mounting 10 has resilient devices 16 that bias the support 12 to bear against upper surfaces of multiple adjusters 20. The adjusters 20 each include a threaded member 21 that is utilized to adjust the height of a part of the support 12 relative to the base 14. In addition, each of the adjusters 20 includes a cam member 22 with a cam surface that bears against a slot in the support 12. Turning of the adjusters 20 may cause rotation of the cam surfaces, resulting in translation of the support 12 in a direction or directions substantially parallel to the base 14. The support 12 includes mountings or mounting points 24 to facilitate mounting of an optical device to the support 12.

An aspect of the mounting 10 is that the adjusters 20 are configured so that the adjusters 20 may be adjusted one at a time. In some embodiments of the mounting 10 this is achieved though a combination of critically constrained motion, spherical bearings to interface between the screw adjustments and the cams, and compliant springs for "piston" motion. However, such adjustment configurations may be achieved in any of a variety of suitable ways. None of the individual features mentioned above is essential for achieving the single adjustment.

The optical mounting 10 provides a "single tiered adjustment" between the support or frame 12 and the base 14. In contrast, typical prior approaches have one or more intermediate tiers between the base and the optical element to be adjusted. The intermediate tier in these systems is adjusted in from one to three degrees of freedom relative to the base. In such a system another adjuster, providing further degrees of freedom, is mounted on that tier, and the optical element is on that adjuster. Nested gimbals are one example of such a prior multi-tiered configuration. Compared to multi-tiered adjustment mechanisms, this single tiered approach provides a variety of significant advantages. First, the thermal path from the base to the optical element is far more direct (particularly critical for maintaining cooldown time and thermal uniformity in cryogenic systems, and to enhance stiffness under vibrational loads). This also reduces the weight, size, and ultimately the cost, of the adjustment. The phrase "single tiered adjustment" is used herein to refer to optical mounting systems that distinguish such stacked multi-tiered systems.

The optical mounting 10 shown in FIG. 1 provides an overall conceptual framework for the discussion of various specific embodiments discussed below. It will be appreciated that the various parts of the optical mounting 10 may take any of a variety of suitable forms, only some of which are discussed below. It will be further appreciated that the various forms of parts of an optical mounting that are discussed below may be combined in various suitable combinations.

FIGS. 2-6 show an optical mounting 110 that has three adjusters 120 for adjusting the position of a frame 112 in six degrees of freedom, relative to a base 114. More broadly, the optical mounting 110 is adjustable at least four degrees of freedom. The frame 112 has mounting points 124 for receiving an optical device that is mounted to the frame 112. The optical device may be mounted to the frame in any of a variety of suitable ways, such as by use of suitable threaded fasteners.

The base 114 includes base flexures 126, which are cantilever beams the free ends of which are coupled to the frame 112 at the points where the adjusters 120 pass through the frame 112. The base flexures 126 function as resilient devices to provide a spring force that pushes the frame 112 away from the base 114, in opposition to the adjusters 120. The base flexures 126, being a continuous, unitary part of the base 114 as a single piece of material, advantageously provide good thermal conductivity with the base 114. Good thermal conductivity between the frame 112 and the base 114 may be a desirable characteristic of the optical mounting 110, especially in view of the cryogenic temperatures that may be used for optical systems. For optical systems with parts at cryogenic temperatures, conducting away heat generated by operating parts may be an important concern. Nonetheless, it will be appreciated that alternatively other sorts of resilient devices may be utilized to provide a bias force pushing the frame 112 away from the base 114.

Figure 4:
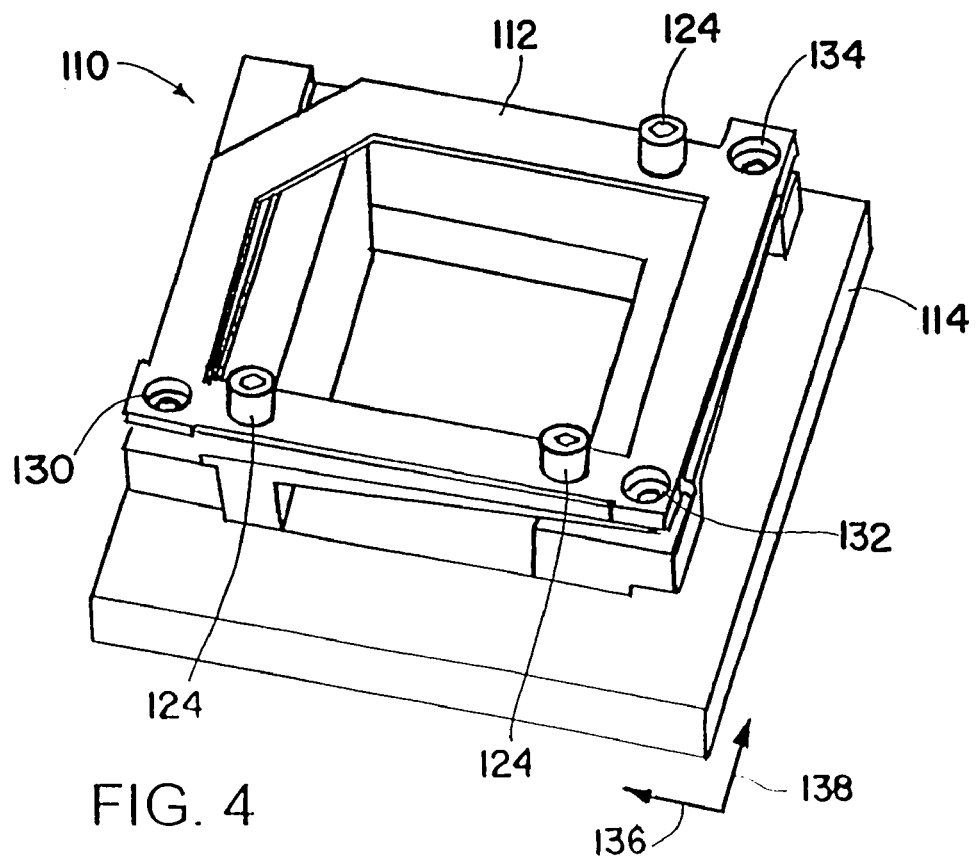
FIG. 4 is another oblique view of the optical mounting of FIG. 2, with the adjusters removed to show positions of the slots on the frame.
Figure 5:
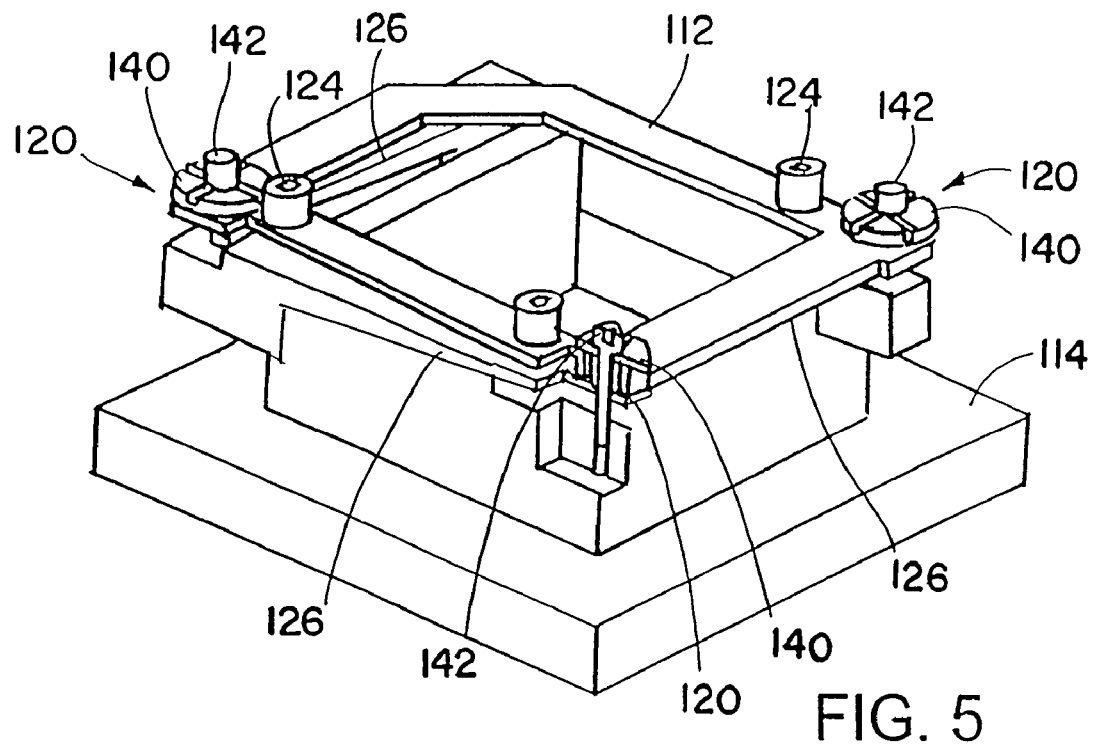
FIG. 5 is a partially cutaway view of the optical mounting of FIG. 2.
Figure 6:
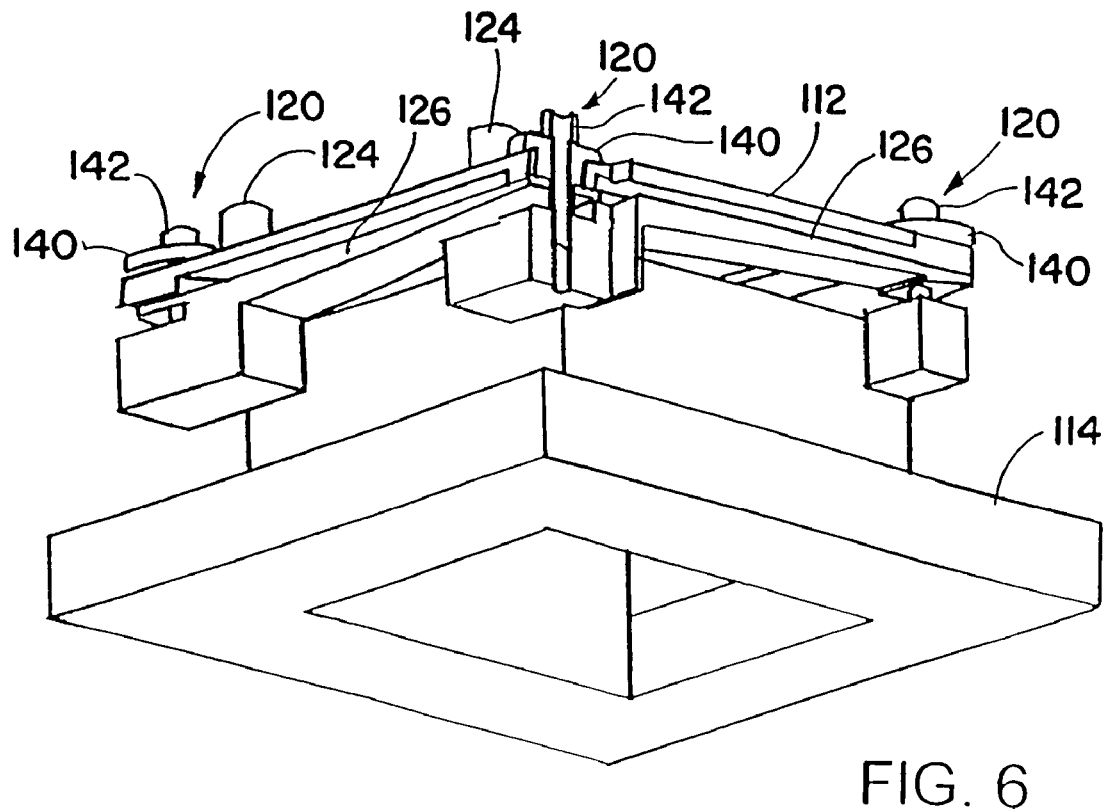
FIG. 6 is another partially cutaway oblique view of the optical mounting of FIG. 2.
Figure 7:
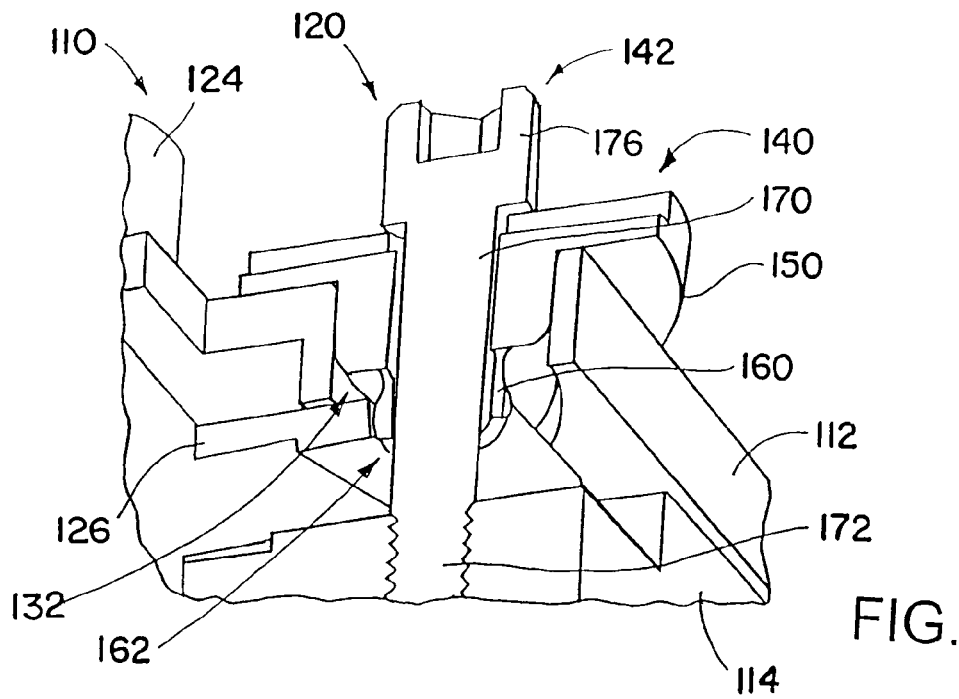
FIGS. 7 and 8 are partially cutaway detailed views of the configuration and location of the adjusters of the optical mounting of FIG. 2.
Figure 8:
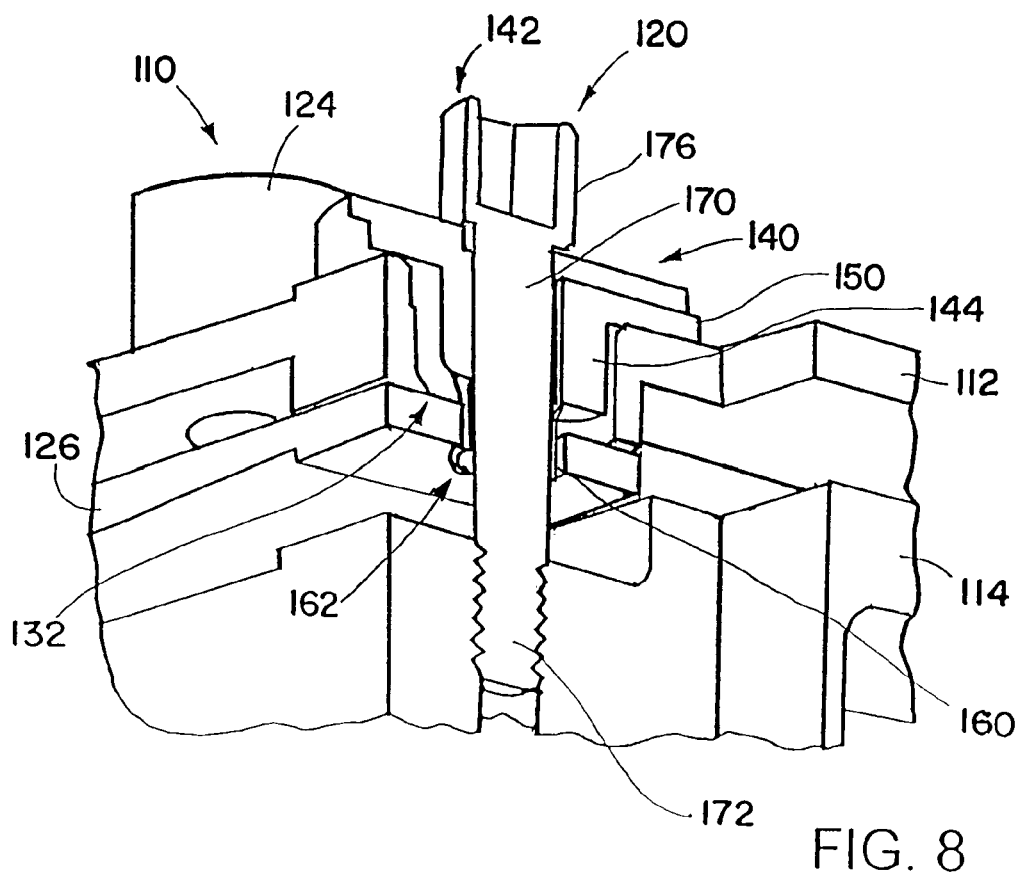
Figure 9:
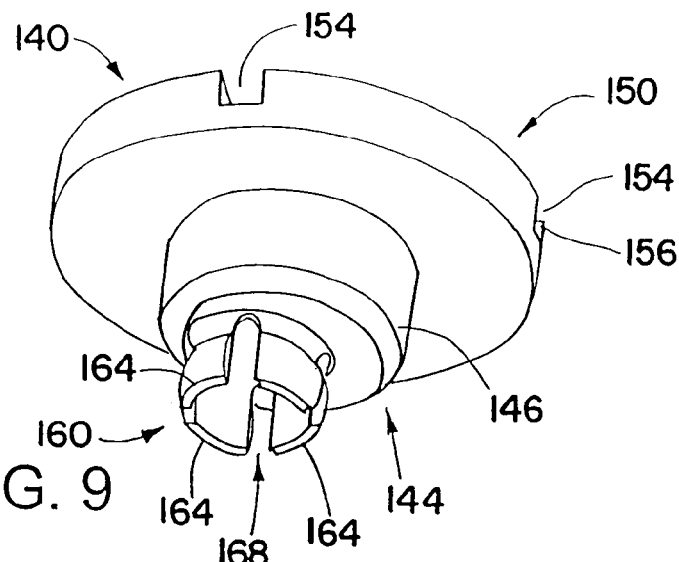
FIGS. 9 and 10 are bottom oblique and top oblique views, respectively, of a cam of the optical mounting of FIG. 2.
Figure 10:
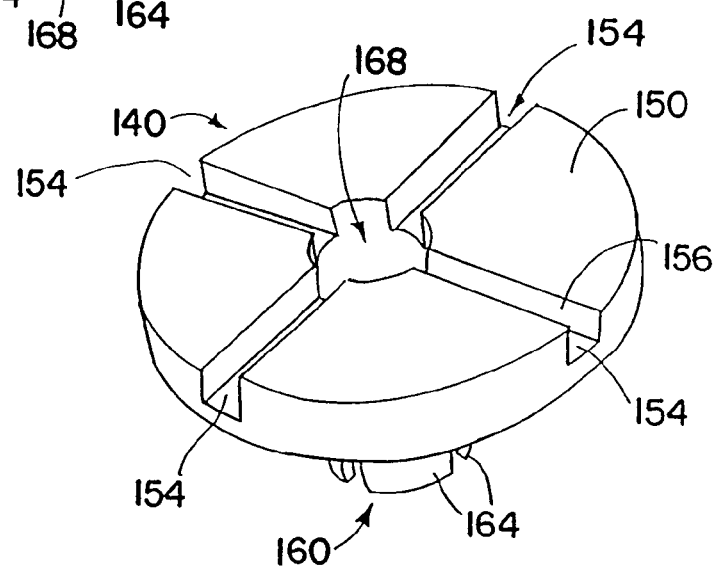
Figure 11:
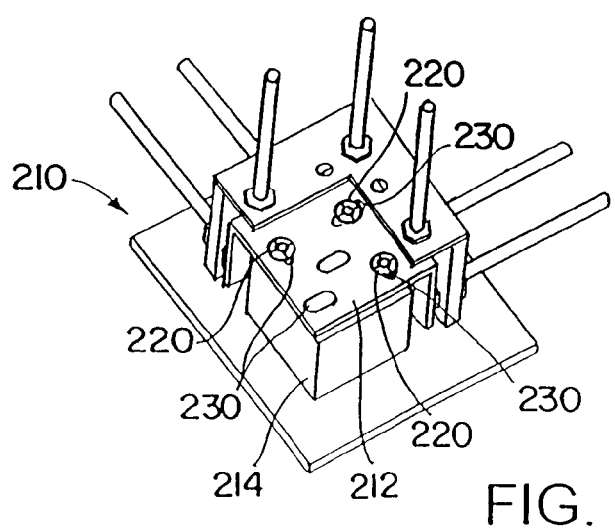
FIGS. 11 and 12 are oblique views of a second embodiment of an optical mounting in accordance with the present invention.
Figure 12:
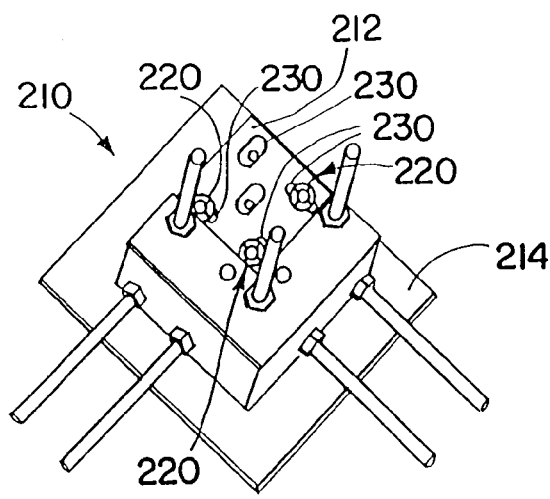
Figure 13:
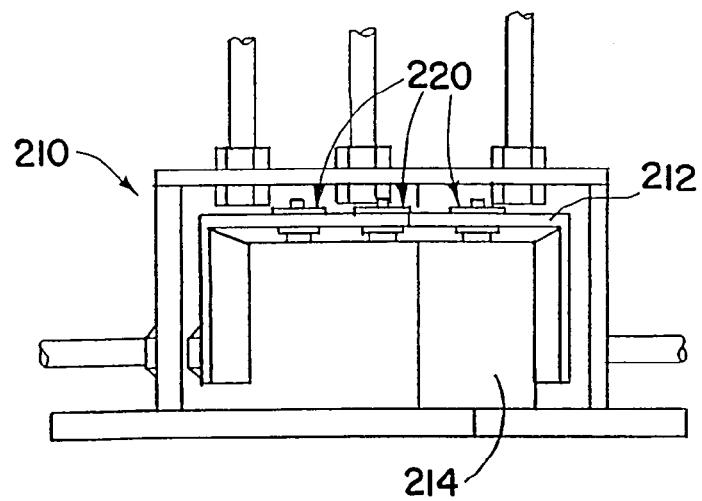
FIG. 13 is a side view of the optical mounting of FIG. 11.
Figure 14:
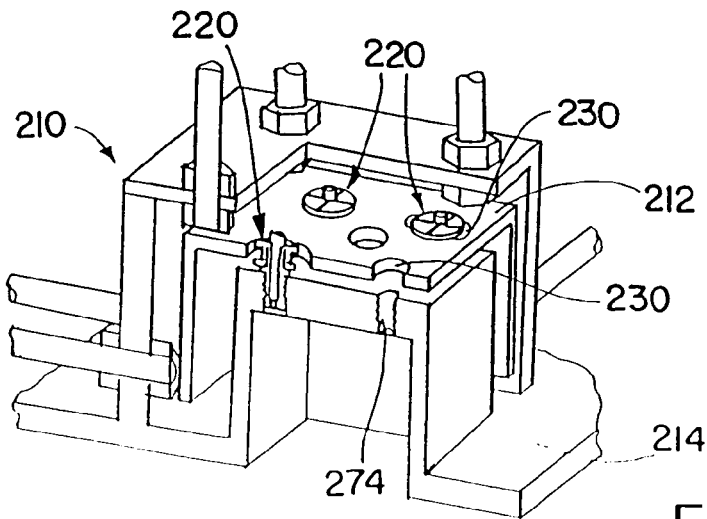
FIG. 14 is a partially cutaway view of the optical mounting of FIG. 11.
Figure 15:
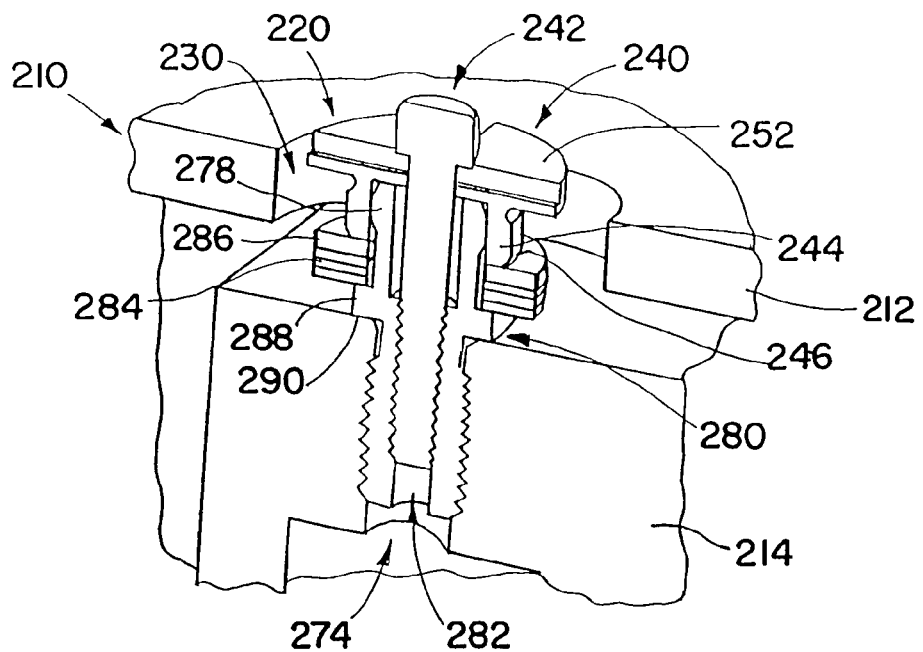
FIG. 15 is a detailed view of a portion of the partially cutaway view of FIG. 14, illustrating the components in operation of the adjusters.
Figure 16:
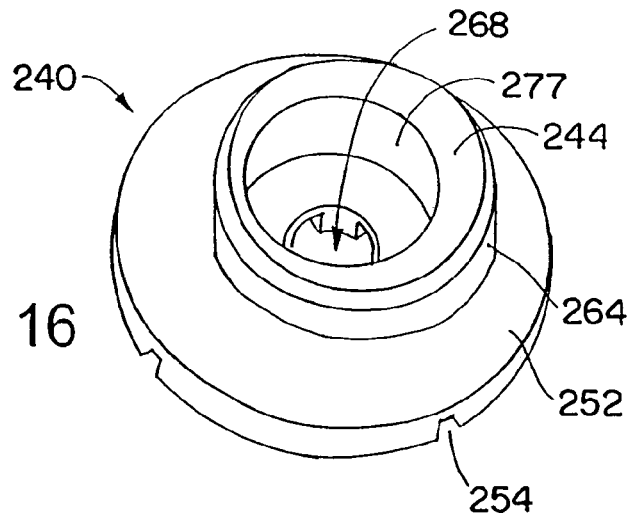
FIGS. 16 and 17 are oblique views of a cam used with the optical mounting of FIG. 11.
Figure 17:
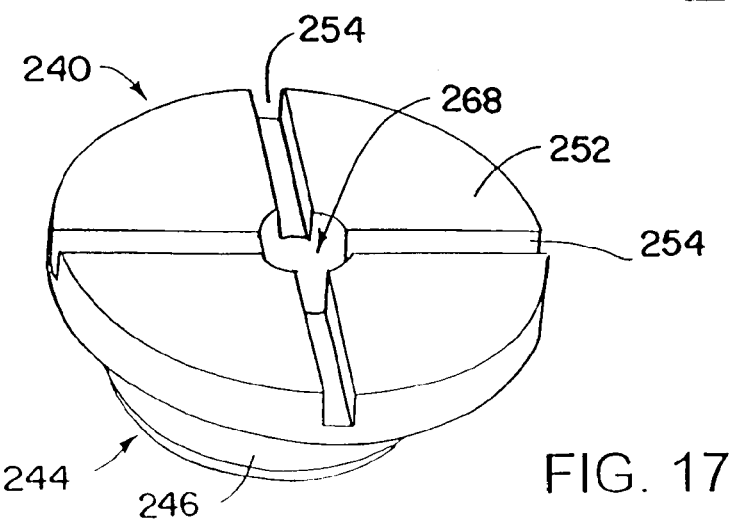
Figure 18:
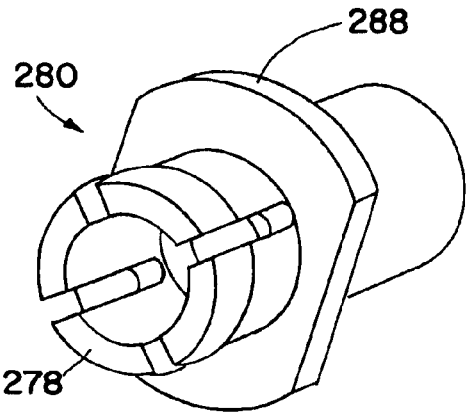
FIGS. 18 and 19 are oblique views showing various aspects of a post used with the optical mounting used in FIG. 11.
Figure 19:
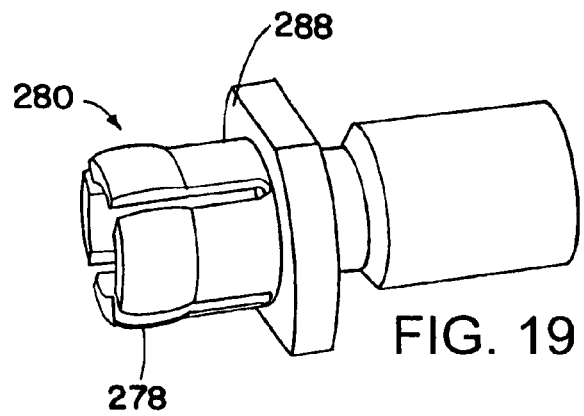

As best seen in FIG. 4, the frame 112 includes elongate slots 130, 132, and 134, for receiving the adjusters 120. Walls of the slots 130, 132, and 134 bear against eccentric cam surfaces of the adjusters 120. Rotation of portions of suitable of the adjusters 120 causes a shifting and reorientation of the eccentric cam surfaces bearing on the slots 130-134, resulting in translation of the frame 112 relative to the base 114. The slots 130 and 134 are elongate in a first direction 136, which allows rotation of the cam surfaces in the slots 130 and 134 to translate the frame 112 in a second direction 138. The slot 132 is elongate in the second direction 138, allowing rotation of the eccentric cam surface in the slot 132 to translate the frame 112 in the first direction 136. More generally, one of the slots may be elongate in a direction at an angle to the elongate direction of one or more of the other slot(s). The angle between the elongation directions may be orthogonal or non-orthogonal, although it will be appreciated that orthogonal directions may make for easier adjustments.

With reference now in addition to FIGS. 7-10, details of the adjuster 120 are discussed. The adjuster 120 includes a cam 140 and a screw 142. The cam 140 is located in the slot 132 with an eccentric cam surface 146 of a cam surface portion 144 bearing against walls of the slot 132. The cam 140 includes a cam head 150 having cam slots 154 therein. The cam slots 154 are engaged by a suitable tool in order to turn the cam 140. One or more of the cam slots 154 may be marked to allow visual or other determination of the orientation of the cam surface 146. For example, one of the cam slots 154 may be colored, such as by a stripe 156, to indicate the long side of the cam surface 146, that is, the side of the cam surface 146 which deviates most in distance from the axis of the cam 140.

The cam 140 has a cam flexure 160 for securely engaging sides of a base flexure hole 162 in the base 114. The cam flexure 160 may include a number of resilient arms 164 that are configured to flex inward to enter the base flexure hole 162, and are configured to press outward against sides of the base flexure hole 162, to thereby secure the cam 160 solidly within the base flexure hole 162. This securement of the resilient cam flexure 160 within the base flexure hole 162 prevents undesirable relative movements of the cam 140 relative to the base flexure 126. It will be appreciated that the securement coupling between the cam 140 and the base flexure 126 may aid in being able to precisely orient the frame 112 relative to the base 114. Any gaps or tolerance ("slop") between the cam 140 and the base flexure 126 would reduce the precision with which the frame 112 may be oriented relative to the base 114.

The cam 140 also has a central hole 168. The eccentric cam surface 146 is eccentrically located relative to the central hole 168. That is, the cam surface is not axisymmetrically located relative to the central hole 168. Therefore, rotation of the cam 140 about the central hole 168 reorients the cam surface 146. The cam flexure 160 however, is axisymmetrically located about the central hole 168.

A screw shaft 170 of the screw 140 passes through the central hole 168. The shaft 170 has a threaded portion 172 which engages an internally threaded hole 174 in the base 114. By turning a screw head 176, the screw 142 may be moved up and down. Spring forces from the base flexure 146 press the frame 112 and the cam 140 up against the screw head 176. Thus turning the screw 142 adjusts the height of the frame 112 relative to the base 114.

This height adjustment is available for all of the adjusters 120 that mechanically couple the frame 112 to the base 114. Thus, the height of the frame 112 relative to the base 114 may be adjusted at three separate locations. The overall height of the frame 112 relative to the base 114 may thus be adjusted. Also, the tilt angle between the frame 112 and the base 114 may be adjusted. Along with the translation adjustments in directions 136 and 138, the adjusters 120 thus allow a six-degree-of-freedom adjustment of the frame 112 relative to the base 114. These adjustments may be effected by the rotation of the two independent parts of each of the adjusters 120, the cam 140 and the screw 142.

In an example embodiment, the cam portions 146 of the cams 140 may have a diameter that is less than about 5 mm (0.2 inches). However, it will be appreciated that the size of the adjusters 120 may vary widely. The accuracy of the optical mounting 110 (accuracy of positioning the frame 112 relative to the base 114) may be within about 0.013 mm (0.0005 inches).

FIGS. 11-14 show an optical mounting 210 for use in locating a support or platform 212 relative to a base 214. Three adjusters 220 are used to adjust the position of the base 214 relative to that of the frame 212. The adjusters 220 include cams 240 for engaging slots 230 in the frame 212. The adjusters 220 also include screws 242 for adjusting the height of at least portions of the frame 212, relative to the base 214.

Referring now in addition to FIGS. 15-19, details of the adjusters 220, and their interaction with the frame 212 and the base 214, are discussed. The cam 240 includes many parts that correspond to those of the cam 140, such as a cam head 252 with slots 254 therein, and a cam surface portion 244 with an outer cam surface 246 eccentrically mounted about a central hole 268. The cam surface portion 244 includes an inner opening 277 for receiving a flexure portion 278 of a post 280 that is mounted in a hole 274 in the base 214. The flexure portion 278 of the post 280 serves to provide a low-hysteresis coupling between the post 280 and the cam 240. The post 280 may be press-fit into the hole 274. The post 280 has an internally threaded hole 282 for engaging a threaded portion 272 of a shaft 270 of the screw 242.

Resilient force to bias the frame 212 to bear upward against the cam head 252 is provided by disk springs 284. The disk springs or spring washers 284 are located between a load distributor or washer 286, and a protruding ledge 288 of the post 280. The ledge 288 also serves as a stop for insertion of the post 280 into the base hole 274. The load distributor 286 bears against a bottom surface 290 of the cam surface portion 244.

The adjusters 220 may be utilized in a manner similar to that of the adjusters 120 described above. That is, the cams 240 may be rotated to translate the frame 212 relative to the base 214 and the screws 242 may be turned to adjust the height of portions of the frame 212 relative to the base 214.

Figure 20:
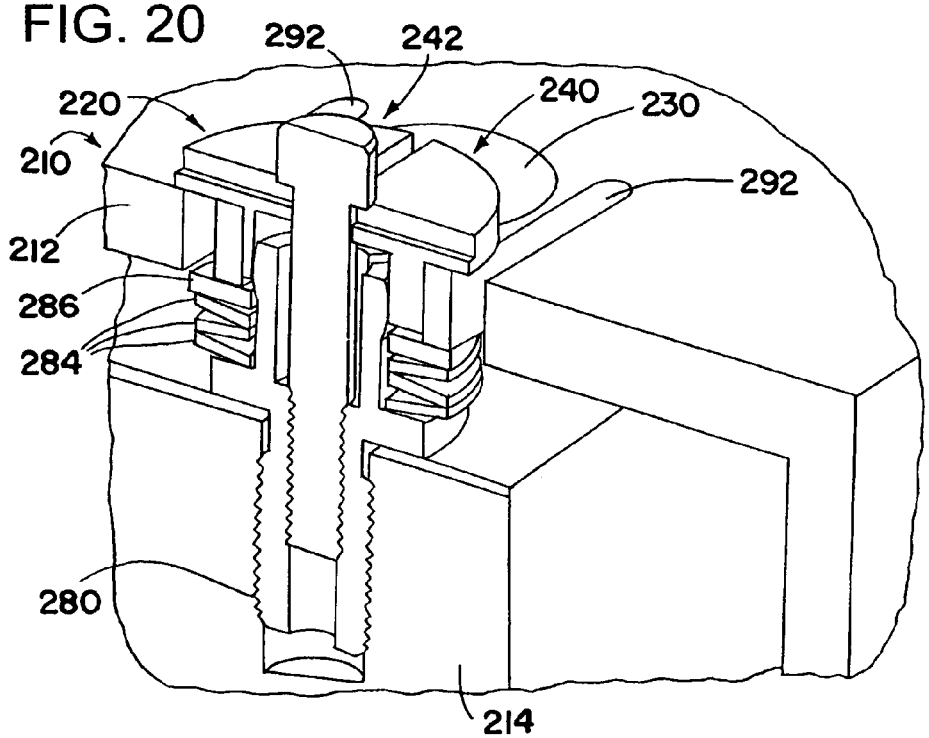
FIG. 20 is a partially cutaway oblique view showing an alternate embodiment optical mounting that utilizes relief slots in the frame or support.

FIG. 20 shows a variation on the optical mounting 210, with secondary relief slots 292 provided alongside the slots 230 in the frame 212. The relief slots 292 allow some outward flexure of the walls of the slot 230 in the direction in which the cam surfaces 246 bear on the slots 230. The relief slots 292 allow for less stringent tolerances in manufacture of the cam surfaces 246 and the slots 230.

Figure 21:
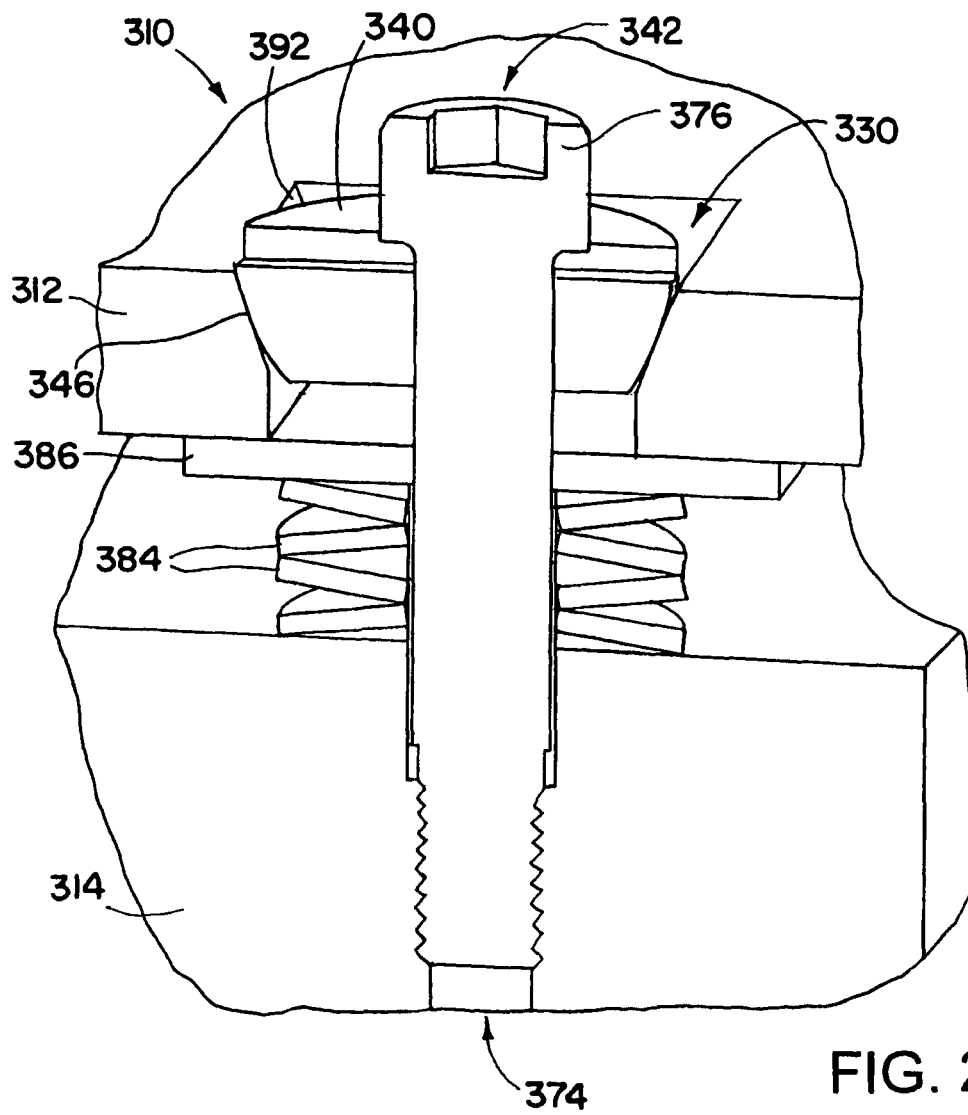
FIG. 21 is a partially cutaway oblique view showing an alternate embodiment optical mounting that uses a cam with a curved surface, which mates with a slot having a sloped surface.
Figure 22:
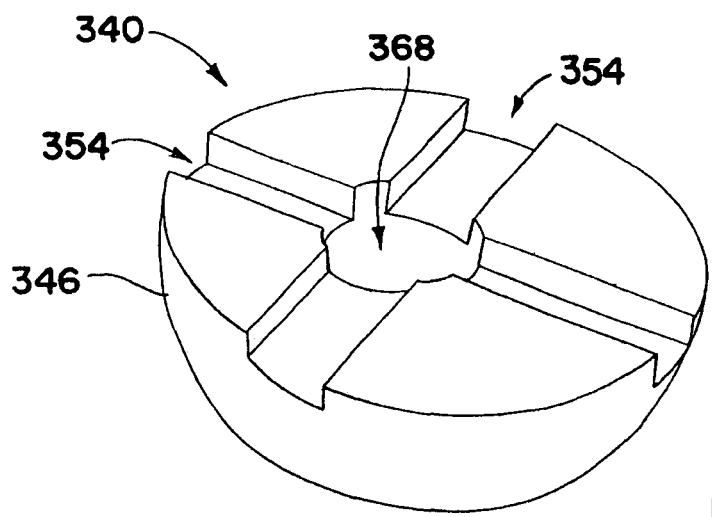
FIG. 22 is an oblique view of the cam of the optical mounting of FIG. 21.

FIGS. 21 and 22 show an optical mounting 310 that employs a cam 340 that has an eccentric cam surface 346 that is curved in more than one direction. That is, besides being curved (eccentrically) about an axis of a central hole 368 of the cam 340, the cam surface 346 is also curved in the direction of the central hole axis so as to make, for example, a spherical surface. The cam surface 346 engages a sloped slot 330. The cam 340 may be turned to allow different portions of the curved cam surface 346 to engage the sloped portions 393 of the slot 330, thereby causing translation of the frame 312 relative the base 314.

In a manner similar to that of other embodiments discussed above, a screw 342 is used to change the height of the frame 312 relative to the base 314, by threading the screw 342 further into or out of a threaded hole 374 in the base 314. A set of disk springs 384 bear against the base 314, and against a load distributor or washer 386. The load distributor 386 in turn bears against the frame 312, pressing the frame 312 and the cam 340 upward against a head 376 of the screw 342. As with other embodiments, the screw 342 and the cam 340 may be adjusted separately. The screw 342 may be adjusted by inserting a suitable wrench, such as an Allen wrench or hex key into a recess in the screw head 376. The cam 340 may be turned by using a suitable tool to engage slots 354 in the cam 340.

Figure 23:
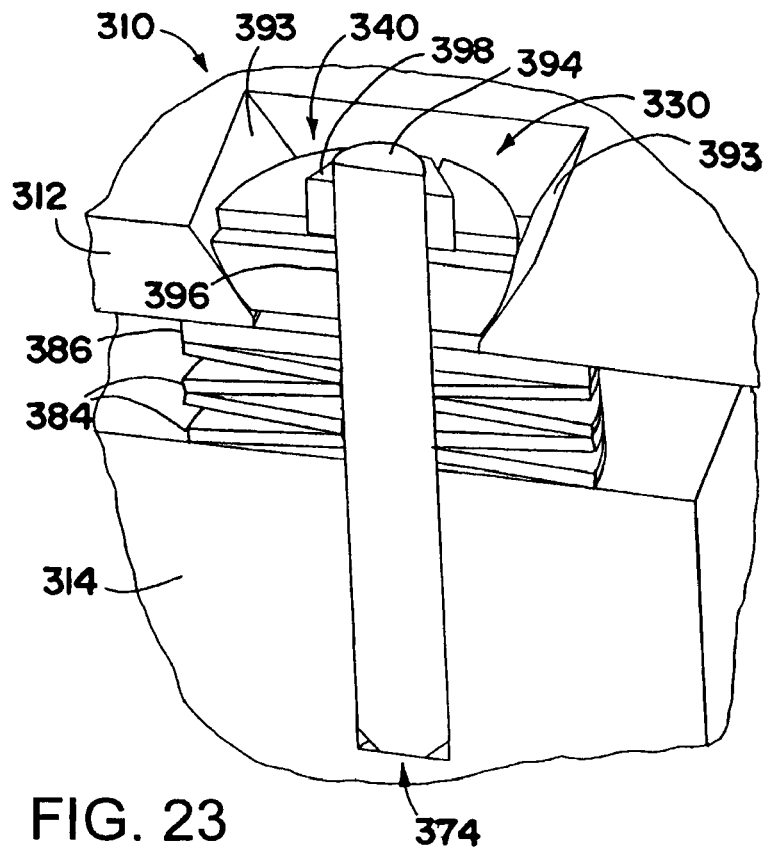
FIGS. 23 and 24 show oblique views of other alternate embodiments, utilizing nuts that are coupled to threaded sections of posts.
Figure 24:
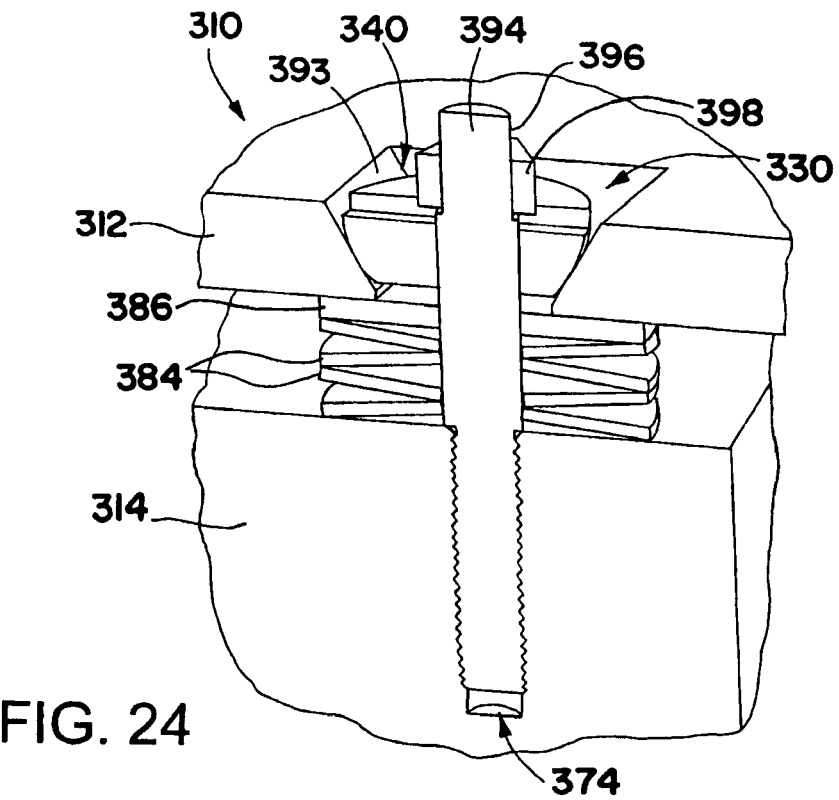

FIGS. 23 and 24 show alternative embodiments of the optical mounting 310 wherein a post 394 is either pressed into (FIG. 23) or screwed into (FIG. 24) a hole 374 in the base 314. The post 394 is secured to the base 314. The post 394 has a threaded upper portion 396 which is configured for receiving a nut 398. The nut 398 may be rotated to adjust the height of the frame 312 relative to the base 314.

Figure 25:
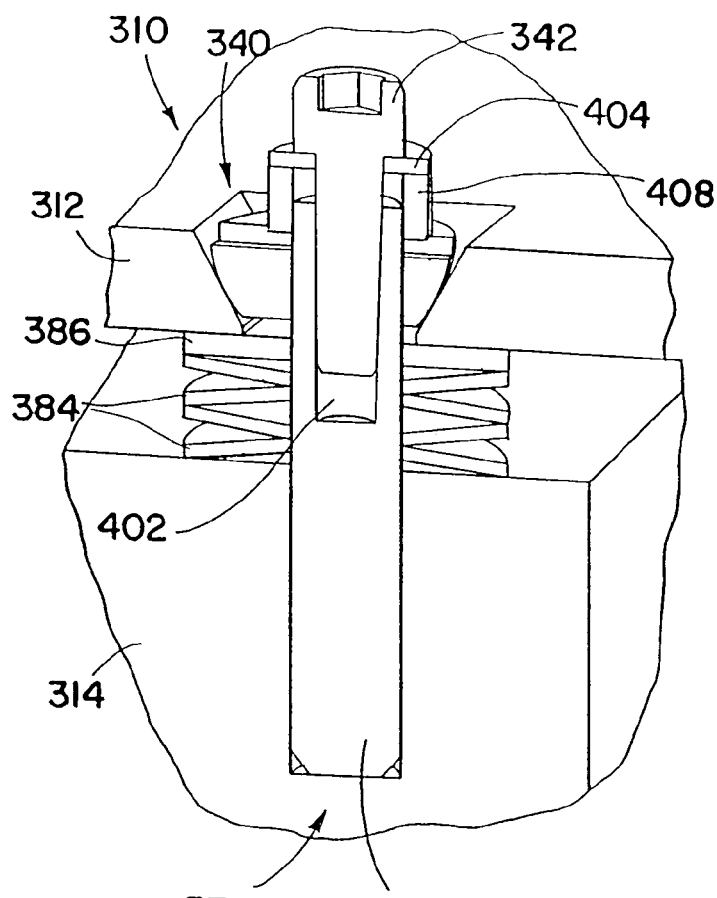
FIGS. 25, 26, 27, and 28 are partially cutaway oblique views showing other embodiments of a coupling between an adjuster, a frame, and a base, as part of an optical mounting in accordance with the present invention.
Figure 26:
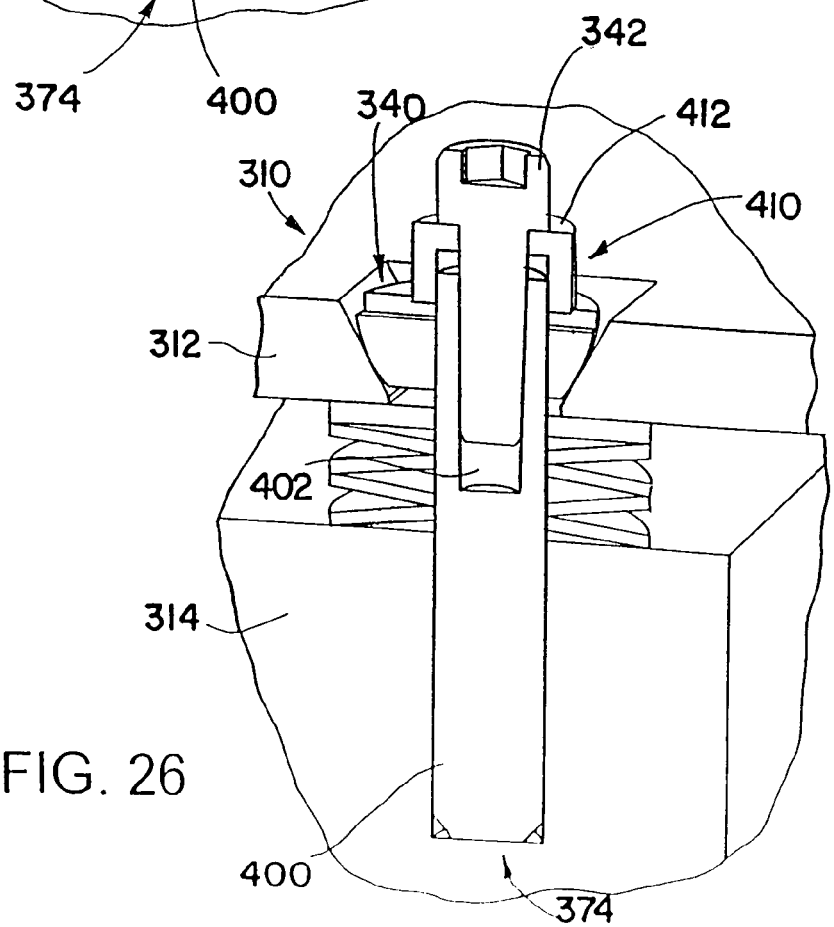

FIGS. 25-28 show further variations to the optical mounting 310, all of which involve a post 400 that has an internally threaded hole 402 for receiving a screw 442. The post 400 is secured to the base 314, either by being press fit or threadedly engaged into the base hole 374. As shown in FIG. 25, the screw head 376 may bear on a washer 404. The washer 404 in turn presses against a collar 408 that is in contact with the top surface of the cam 340. As shown in FIG. 26, the washer 404 and the collar 408 may be combined in a single collar 410 with a ledge 412.

Figure 27:
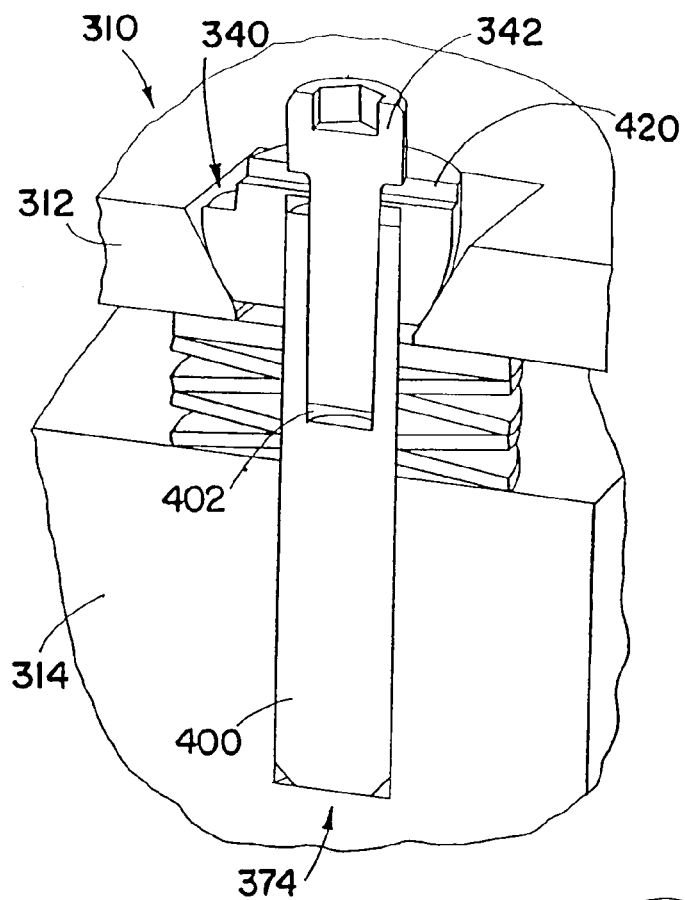
Figure 28:
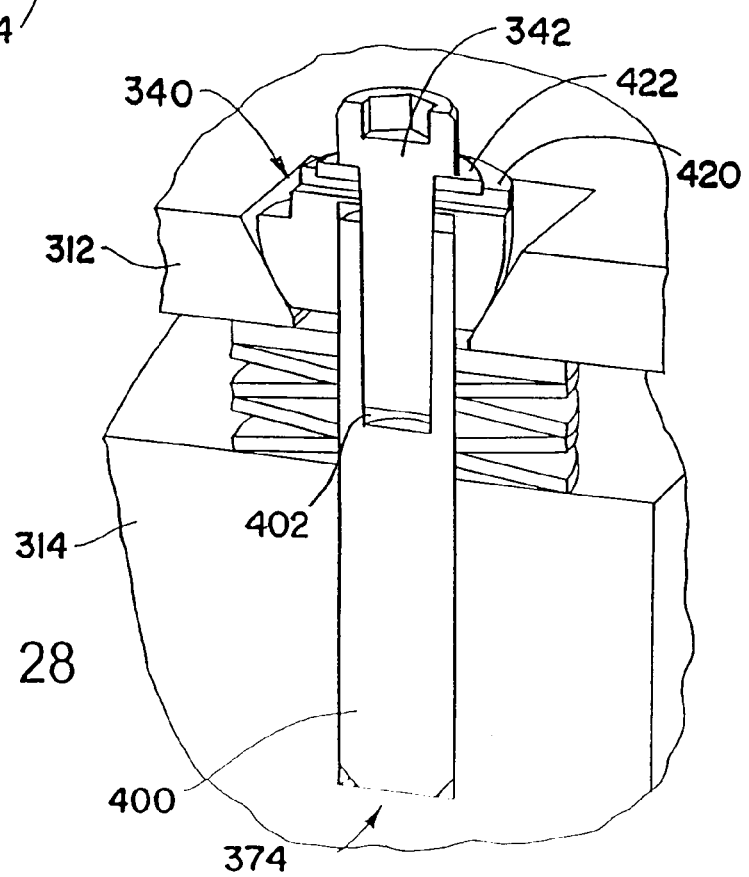
Figure 29:
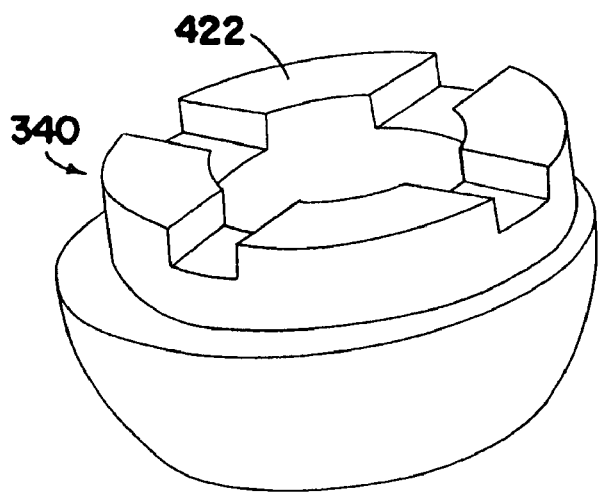
FIG. 29 is an oblique view of a curved cam utilized in the optical mountings of FIGS. 27 and 28.

With reference now in addition to FIG. 29, the cam 340 may have a raised portion 420 that serves at least some of the functions of the collars 408 and 410. The cam 340 with the raised portion 420 may be used to directly contact the screw head 376, as shown in FIG. 27. Alternatively, as shown in FIG. 28 an intervening washer 422 may be provided between the screw head 376 of the screw 342, and the raised portion 420 of the cam 340.

Figure 30:
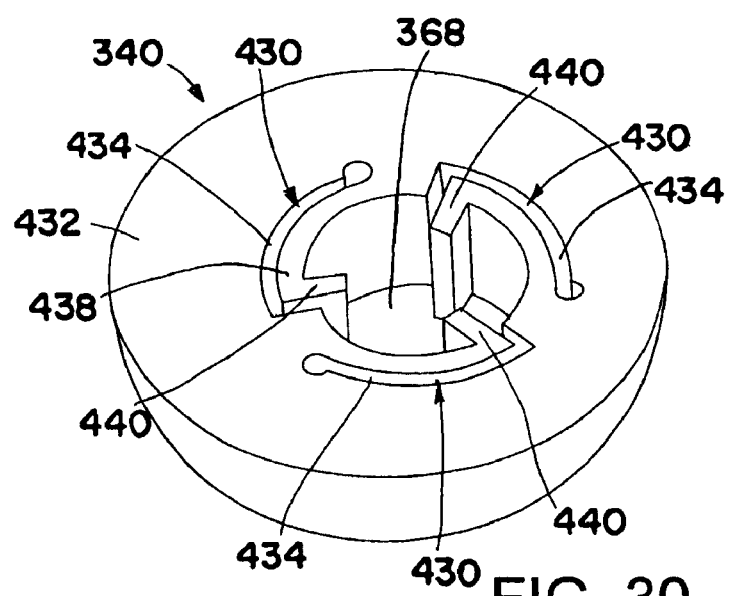
FIG. 30 is a top oblique view of an alternate embodiment cam for use in optical mountings of the present invention.
Figure 31:
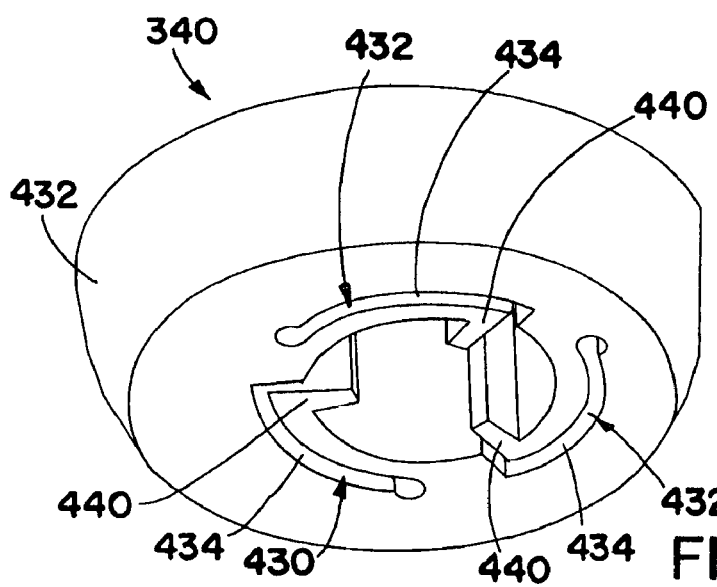
FIG. 31 is a bottom oblique view of the cam of FIG. 30.
Figure 32:
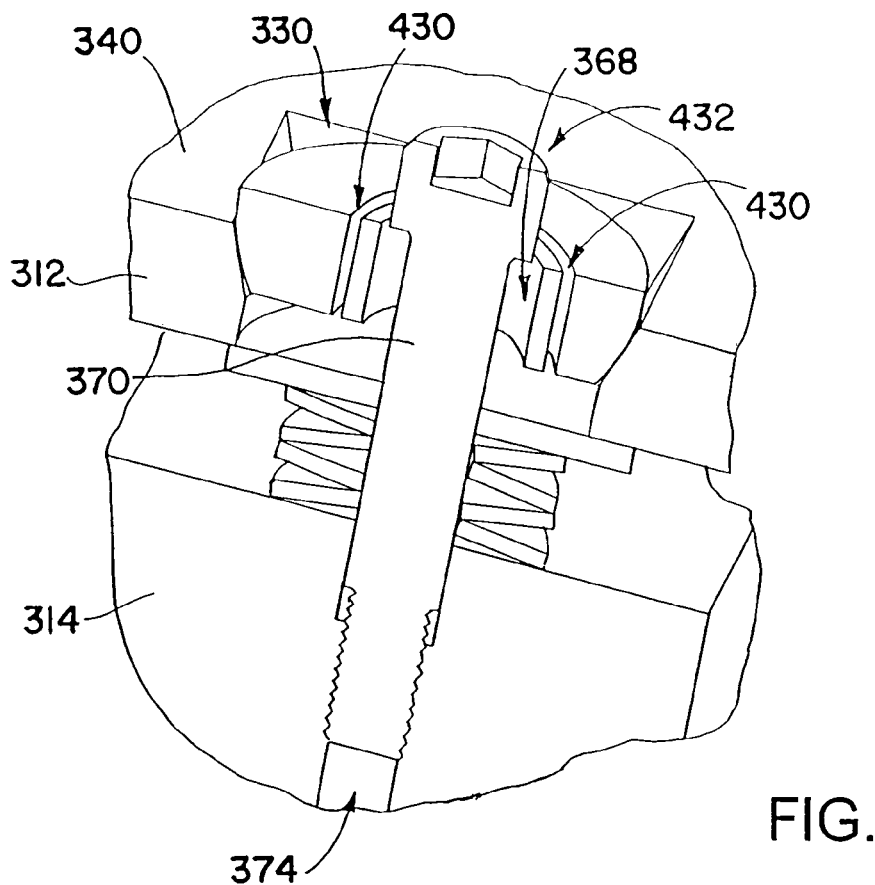
FIG. 32 is a partially cutaway oblique view showing an optical mounting utilizing the cam of FIGS. 30 and 31.

FIGS. 30 and 31 show another alternate embodiment of the cam 340. The embodiment of the cam 340 shown in FIGS. 30 and 31 includes multiple cam flexures 430 about the central hole 368. The cam flexures 430 are partially separated from the main body 432 of the cam 340 by a series of slots 434. The slots 434 are substantially circumferential in direction, leaving cantilevered portions 438 of the cam flexures 430 free to flex in a radial direction. At distal free ends of the cantilever portions 438, the cam flexures 430 include contact portions 440. The contact portions 440 may be substantial radial in orientation, and are configured to contact the screw shaft 370 of the screw 342 placed within the central hole 368, as illustrated in FIG. 32. The use of the cam flexures 430 allows the screw shaft 370 of the screw 342 to be placed through the cam 340 without any clearance between the screw shaft 370 and the cam central hole 368.

Figure 33:
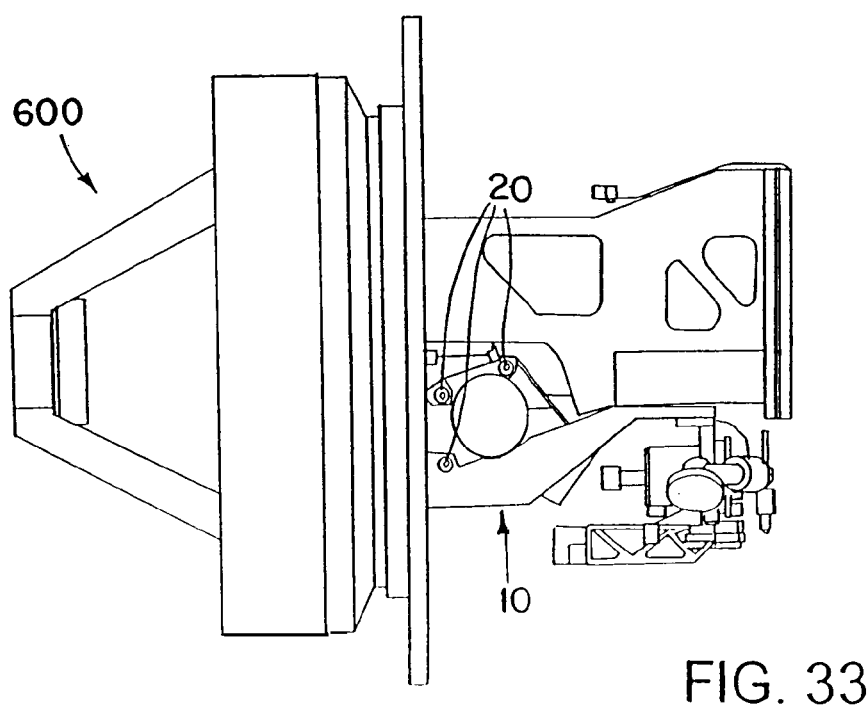
FIG. 33 is an oblique view of an optical mounting in accordance with the present invention utilized as part of an optical system.

FIG. 33 shows the optical mounting 10 as part of an optical system 600. The optical mounting 10 represents and includes all the various embodiment optical mountings disclosed herein. The adjusters 20 of the optical mounting 10 may be used to adjust an optical device that is in a light path for light received by the optical system 600. As an example, the optical mounting 10 may be used to hold a lens to adjust focus of a telescope. However, it will be appreciated that the optical mounting 10 may be utilized in positioning other types of optical devices. Other optical elements that may be coupled to the optical mounting include infrared and visible light detector arrays, lenses, mirrors, spatial light modulators, holographic elements, and so on.

Further, it will be appreciated that various embodiments of optical mountings disclosed herein may be utilized for other purposes, such as for precision location and mounting of non-optical devices.

The various optical mountings described herein provide a compact and easy to operate way of adjusting position of an optical device. Unlike certain prior systems, the optical mountings disclosed herein are compact enough to be utilized in a limited volume, such as within a missile. Also unlike certain prior devices, the optical mountings disclosed herein may be adjusted without a need to even partially disassemble an optical system that they are part of. The system is configured so that the various adjustable portions of the adjusters, such as the cams, screws, bolts, or nuts, may be easily reached and rotated with the optical mounting installed in the system, and with an optical device coupled to the optical mounting. It will be appreciated that the optical mountings disclosed herein provide a way of achieving fast and accurate adjustments of optical systems.

The various optical mountings described herein offer several advantages over at least some prior mountings. The optical mountings provide a way for shimless adjustment. The phrase "shimless adjustment," used herein, is defined with regard to a system wherein shims are not used as a final, fine adjustment mechanism. A system can be a shimless adjustment system. A system, as the term is used herein, may use one or more shims as a coarse adjustment mechanism, while relying on an adjustment mechanism other than shims for final adjustment. The adjustable optical mountings described herein do not have to be disassembled in order to be finally adjusted. As explained in greater detail below, this enables the optical mountings to be adjusted while in a controlled environment, such as a non-ambient environment that simulates the temperature and/or pressure encountered in expected use of the optical system 600. The optical system 600 may be adjusted within the controlled environment in real time, during operation of the optical system. This provides real-time feedback of the effects of the adjustments. Alternatively, adjustments to the optical system may be alternated with periods of operation or testing.

The optical mountings also have the advantage that adjustments may be made one at a time. This is in marked contrast to other designs that require simultaneous manipulation of two or more adjustments to avoid putting undesirable stresses on the optical element coupled to the optical mount. Optical mountings where adjustment of a single manipulator or adjuster does not cause other adjusters to bind, and does not substantially stress an optical element secured to the optical mounting, are referred to herein as "independent adjustment mountings." Independent adjustment mountings, such as those described herein, avoid damage to optical elements, such as bending, deformation, cracking, or other types of damage. Movement of the adjusters of the optical mountings described herein advantageously do not result in forces tending to push against or bind other adjusters.

Another advantage is that the optical mountings described herein maintain their alignment (configuration) without any input of force. A locking mechanism may be used as part of the optical mounting. The locking mechanism may be a self-locking mechanism. Alternatively, the optical mounting 10 may have enough internal binding force to maintain its alignment until permanently bonded, pinned, or locked through some other means.

It will be appreciated that many variations are possible with regard to the above-described optical mountings. For instance, it is possible for the threaded fasteners to be replaced with perpendicularly-mounted cams. Also, as an alternative to the cam-receiving slots described above, the slots for the cams may have one or both walls being compliant, for example having a thin wall section that has a degree of compliance to minimize tolerances between the slot and the cam. Such a compliant wall may be part of a slot having a pair of parallel walls, for receiving a suitable spherical bearing or cam.

Figure 34:
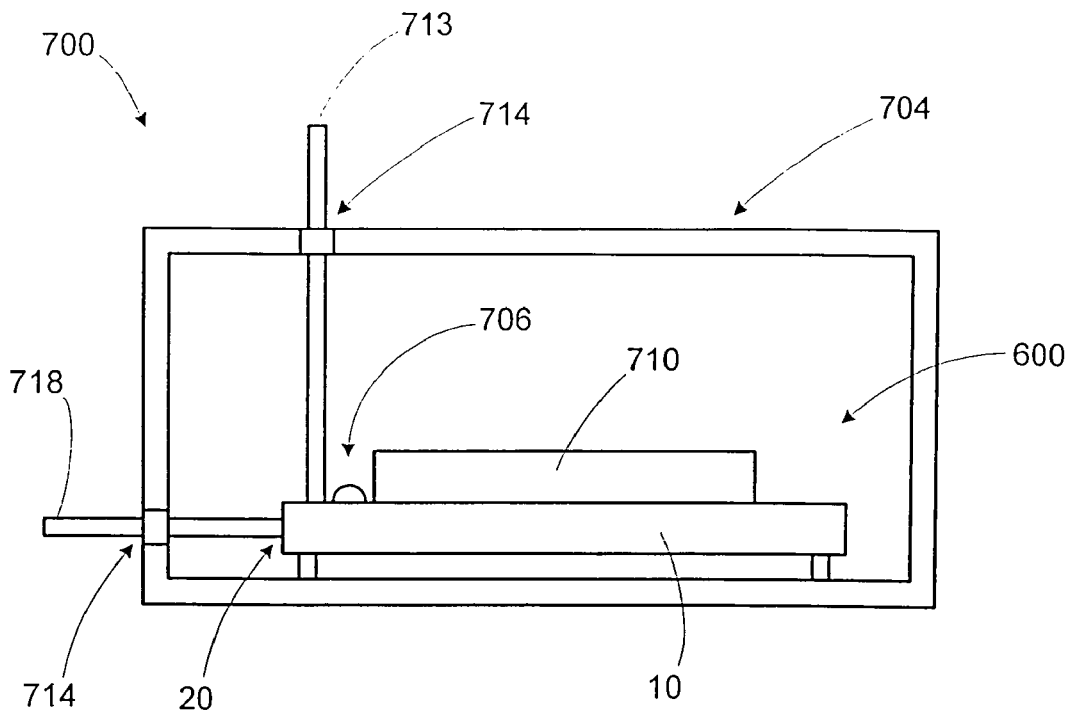
FIG. 34 is a schematic view of an adjustment system in accordance with one embodiment of the invention.

FIG. 34 schematically illustrates a system 700 for adjusting the optical system 600. The system 700 is placed in a controlled environment enclosure 704 capable of producing and maintaining a controlled environment within. The controlled environment enclosure 704 may be configured to produce a non-ambient temperature and/or a non-ambient pressure, for example to simulate an environment encountered by the optical system 600 in actual use. Optical systems 600 are often maintained at cryogenic temperatures, and the environment within in the enclosure 704 may be at a cryogenic temperature to reflect this. Alternatively or in addition, the environment within the controlled environment enclosure 704 may be maintained a below-ambient pressure, such as being a vacuum environment. This environment mimics the vacuum environment that may be encountered during expected use of the optical system, such as in a missile.

As described above, the optical system 600 includes the optical mounting 10, which may be adjusted through manipulation of the adjusters 20. The system 600 includes a self-locking mechanism 706 for mechanically or otherwise locking the optical system in place in a desired adjusted configuration.

An optical device 710 is coupled to the optical mounting 10. The optical device 710 may be any of a variety of optical devices, including lenses, mirrors, infrared detectors, and physical light detectors as previously discussed.

The controlled environment enclosure 704 has multiple rotation feedthroughs 714. An example of a suitable feedthrough is the MDC BRM-133, available from MDC Vacuum Products of Hayward, Calif., or other comparable selections from their vacuum products. The feedthroughs 714 allow remote adjuster rods 718 to pass through walls of the controlled environment enclosure, and be rotated relative to the walls, without compromising the controlled environment within the controlled environment enclosure. The remote adjuster rods 718 engage the adjusters 20 of the optical mounting 10 such that rotation of the rods 718 adjusts the positioning of the optical mounting 10. Each of the adjusters 20 may have a corresponding adjuster rod 718 coupled to it. Thus while only two adjuster rods 718 are illustrated in FIG. 34, it will be appreciated that the system 700 may include additional adjuster rods. It also will be appreciated that there are many other suitable ways of mechanically remotely engaging the adjusters 20.

Figure 35:
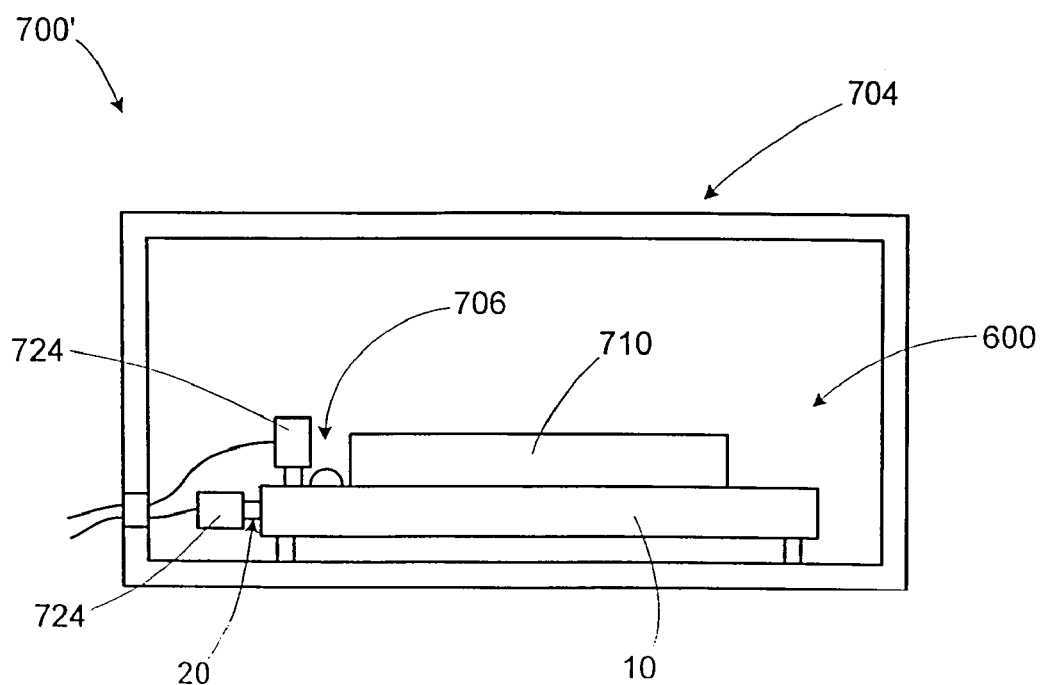
FIG. 35 is a schematic view of an adjustment system in accordance with another embodiment of the invention.

FIG. 35 illustrates another alternative way of manipulating the adjusters 20 of the optical mount 10. The adjusting system 700' shown in FIG. 35 uses electrically-powered actuators 724 to manipulate the adjusters 20 within the controlled environment enclosure 704. The actuators 724 may include suitable motors for providing desired turning of the adjusters 20, to adjust positioning of optical mount 10. Suitable wired or wireless controls may be provided to control operation of the actuators 724 from outside of the controlled environment enclosure 704. Conventional vacuum-rated stepper motors are suitable for this task, in some cases using insulating sleeves (such as titanium tubes) to attach them to the adjustment points. Even when the optical system is adjusted while cryogenically cooled within a vacuum chamber, the adjustment motors generally remain at near ambient temperatures. For extreme situations, Mission Research Corporation (MRC) provides stepper motors that are also rated for cryogenic operation.

In adjusting the optical system 600, the system 600 is assembled and then placed in the controlled environment enclosure 704. The environment within the enclosure 704 is then set as desired, with the temperature and/or pressure set to a desired non-ambient level. Optical measurements are made, and then appropriate adjustments to the system 600 are accomplished by remotely manipulating the adjusters 20. The process of testing and re-adjustment (if necessary) is then performed iteratively until desired performance of the optical system 600 is reached. In some cases the adjustments can be done while the system is in operation, adjusting interactively for optimal performance. The optical system 600 may then be removed from the controlled environment enclosure 704, and the alignment of the optical system 600 may be more permanently secured, such as by locking, pinning, or bonding. Alternatively, the permanent securing of the alignment may occur within the controlled environment enclosure 704.

One advantage of the present method is that time and effort of optical alignment is reduced, relative to methods that require disassembly to effect adjustment. The present method avoids the time and effort of assembly and disassembly, and the time and effort of achieving the desired environment conditions for multiple iterations. Also, by measuring interactively, the effective adjustment error is reduced.

Another advantage is that the adjustments are done directly under the desired operating conditions. In prior systems adjustments were made under ambient conditions that are different from the operating environment conditions. This can lead to inaccuracies in adjustment.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A method of adjusting an optical system, the method comprising:
    placing the optical system in a controlled environment enclosure;
    producing non-ambient conditions within the enclosure; and
    adjusting an optical mount of the optical system while the optical system is in the non-ambient conditions within the enclosure;
    wherein the adjusting includes shimless adjusting of the optical mount;
    wherein the adjusting includes remote adjusting by rotation of parts of the optical mount;
    wherein the optical mount is a single-level-of adjustment mount that includes:
        a base;
        a support configured to receive the optical device; and
        plural adjusters having respective cams that include eccentric cam surfaces that are mechanically coupled to the support; and
    wherein rotation of the cams causes translation of the support relative to the base.

2. A method of adjusting an optical system, the method comprising:
    placing the optical system in a controlled environment enclosure;
    producing non-ambient conditions within the enclosure;
    adjusting an optical mount of the optical system while the optical system is in the non-ambient conditions within the enclosure; and
    permanently securing the alignment of the optical system.

3. The method of claim 2, wherein the producing the non-ambient conditions includes producing a cryogenic temperature within the enclosure.

4. The method of claim 2, wherein the adjusting includes shimless adjusting of the optical mount.

5. The method of claim 4, wherein the adjusting includes remote adjusting by rotation of parts of the optical mount.

6. The method of claim 1, wherein the optical mount is adjustable in at least four degrees of freedom.

7. The method of claim 6, wherein the optical mount is adjustable in six degrees of freedom.

8. The method of claim 1, wherein the adjusters also include respective threaded fasteners and respective resilient devices that are mechanically coupled to the base and the support, and that are configured to adjust the height of parts of the support, relative to the base.

9. The method of claim 1, wherein the optical mount is a single adjustment mounting.

10. The method of claim 2, wherein the adjusting is shimless adjusting.

11. The method of claim 2, wherein the optical system also includes an optical device secured to the optical mount.

12. The method of claim 2, wherein the producing the non-ambient conditions includes producing a vacuum within the enclosure.

13. A method of adjusting an optical system, the method comprising:
    placing the optical system in a controlled environment enclosure;
    producing non-ambient conditions within the enclosure; and
    adjusting an optical mount of the optical system while the optical system is in the non-ambient conditions within the enclosure;
    wherein the adjusting includes adjusting rods that pass through rotational feedthroughs of the controlled environment enclosure.

14. The method of claim 2, wherein the adjusting includes remote adjusting utilizing actuators inside the controlled environment enclosure.

15. The method of claim 13, wherein the producing the non-ambient conditions includes producing a vacuum within the enclosure.

16. The method of claim 13, wherein the producing the non-ambient conditions includes producing a cryogenic temperature within the enclosure.

17. The method of claim 13, wherein the adjusting includes shimless adjusting of the optical mount.

18. The method of claim 13, wherein the adjusting is shimless adjusting.

19. The method of claim 13, wherein the optical system also includes an optical device secured to the optical mount.

20. The method of claim 13, further comprising permanently securing the alignment of the optical system.

* * * * *